US009062994B2

(12) United States Patent
Ifft et al.

(10) Patent No.: US 9,062,994 B2
(45) Date of Patent: Jun. 23, 2015

(54) LOCATING OF PRESSURE TAPS ON FACE OF ORIFICE PLATE DEVICE

(75) Inventors: Stephen Arthur Ifft, Longmont, CO (US); Charles Theodore Orleskie, Berthoud, CO (US)

(73) Assignee: Dieterich Standard, Inc., Boulder, CO (US)

( * ) Notice: Subject to any disclaimer, the term of this patent is extended or adjusted under 35 U.S.C. 154(b) by 0 days.

(21) Appl. No.: 11/764,030

(22) Filed: Jun. 15, 2007

(65) Prior Publication Data

US 2008/0307896 A1    Dec. 18, 2008

(51) Int. Cl.
*G01F 1/46* (2006.01)
*G01F 1/32* (2006.01)
*G01F 1/42* (2006.01)

(52) U.S. Cl.
CPC .......................................... *G01F 1/42* (2013.01)

(58) Field of Classification Search
USPC .......................................... 73/861.52–861.66
See application file for complete search history.

(56) References Cited

U.S. PATENT DOCUMENTS

| 2,614,423 | A | * | 10/1952 | Carbone | 73/861.61 |
| 2,803,962 | A | * | 8/1957 | West | 73/861.61 |
| 2,842,962 | A | * | 7/1958 | Dall | 73/861.61 |
| 2,927,462 | A | * | 3/1960 | Li | 73/861.58 |
| 3,590,637 | A | * | 7/1971 | Brown | 73/861.65 |
| 3,759,098 | A | * | 9/1973 | Logsdon et al. | 73/861.52 |
| 4,290,314 | A | * | 9/1981 | Geronime | 73/861.52 |
| 4,370,893 | A | * | 2/1983 | Combes | 73/861.61 |
| 4,399,708 | A | * | 8/1983 | Van Scoy | 73/861.61 |
| 4,476,730 | A | * | 10/1984 | Brumm | 73/861.61 |
| 4,750,370 | A | * | 6/1988 | Ossyra | 73/861.61 |
| 4,938,077 | A | * | 7/1990 | Robinet | 73/861.62 |
| 6,321,166 | B1 | * | 11/2001 | Evans et al. | 73/861.65 |
| 7,284,450 | B2 | * | 10/2007 | Orleskie et al. | 73/861.52 |
| 2003/0188586 | A1 | * | 10/2003 | Orleskie et al. | 73/861.61 |

* cited by examiner

*Primary Examiner* — Harshad R Patel
(74) *Attorney, Agent, or Firm* — Westman, Champlin & Koehler, P.A.

(57) ABSTRACT

A process flow device that includes a self-averaging orifice plate type of primary flow element with a high pressure tap located on or incorporated into its upstream surface, and a low pressure tap located on or incorporated into its downstream surface, for measuring, by a differential pressure process, the volumetric rate of fluid flow at a point in a fluid carrying conduit where the velocity profile of the fluid is asymmetric with respect to the longitudinal axis of the conduit. The improved pressure tap configuration consists of two fluid conduits, one carried by each of the downstream and upstream faces of the orifice plate, establishing fluid communication between openings in the downstream and upstream faces of the orifice plate and their respective terminal pressure ports. Location of the pressure taps on the faces of the orifice plate in this manner allows for increased resolution of the pressure signals by minimizing the effects of upstream pipe flow disturbances on pressure taps used in conjunction with conditioning orifice plate primary flow elements, especially those with higher beta ratios.

6 Claims, 5 Drawing Sheets

LOCATING OF PRESSURE TAPS ON FACE OF ORIFICE PLATE DEVICE

FIELD OF THE INVENTION

The present invention relates generally to a process flow device that includes a multiple aperture orifice plate type of primary flow element having at least one pressure tap located on its face in order to minimize disturbances in measuring, by a differential pressure process, the volumetric rate of fluid flow at a point in a fluid carrying conduit.

BACKGROUND OF THE INVENTION

Differential pressure process flow meters, long known in the art, measure the rate of flow of a liquid or gas by calculating the difference in pressure between a measurement taken at a high pressure tap upstream of a process flow device, and a low pressure tap downstream of the process flow device. When the primary flow element used is an orifice plate within a fluid carrying conduit such as a pipe, commonly used pressure tap types include: flange taps, corner taps, D & D/2 taps, and pipe taps. Although the tap configuration and axial distances from the orifice plate differ, all of these pressure tap types are located at, or affixed to, the pipe wall. While the accuracy of such taps is good for well-developed fluid flow and stable pipe conditions, in certain conditions pipe flow disturbances may occur along the pipe wall, interfering with the proper operation of these common tap types and creating disturbances in the pressure signals they generate.

Pipe flow disturbances within a pipe can have a number of causes including an upstream fitting such as an elbow in the pipe. The commonly used apparatus to correct for these flow disturbances is a flow straightener, of the type disclosed in U.S. Pat. No. 5,596,152 or apparatus similar to the flow conditioner described in U.S. Pat. No. 3,733,898. A more complex apparatus, employing a plurality of elongated openings arranged in a predetermined pattern in a transversely disposed plate within the fluid-conducting pipe, together with a computer to deal with the necessary algorithms, is disclosed in U.S. Pat. No. 5,295,397. Yet another device for reducing the adverse measuring effects of a distorted velocity profile is known as the piezometer ring. This appliance may surround the orifice on both sides of the orifice plate and, by means of a plurality of circumferentially disposed pressure sensing ports, averages pressures around the upstream and downstream sides of the orifice. Although not shown with an orifice plate flow meter, a piezometer type of averaging sensor is described generally in U.S. Pat. No. 5,279,155.

Flow straighteners, conditioners, computers and piezometers are moderately effective to properly condition the velocity profile for introduction to an orifice plate flowmeter, or average the asymmetric velocity of the flow, but have the disadvantage of adding separate and additional components to the process piping with the attendant initial cost, pressure drop in the fluid, and increased maintenance requirements.

Improved means of conditioning fluid flow that do not experience the aforementioned problems have been developed. One such means is the Rosemount Conditioning Orifice Plate technology, set forth in U.S. Patent Appl. No. 20030188586, Averaging Orifice Primary Flow Element. The Averaging Orifice Plate incorporates a plurality of eccentrically disposed apertures in the surface of the plate to achieve an averaging of the differential pressures across the plate despite velocity profile distortion of the fluid presented to the primary flow element. However, higher beta ratio conditioning orifice plates using common pressure sensing ports spaced some distance upstream and downstream from the plate, are still susceptible to performance errors in disturbed flow conditions due to disturbances in the pipe to which pressure sensing ports are attached or the impact of the disturbances on the pressure sensing ports themselves.

Accordingly, the primary object of the present invention is to maintain the benefits of utilizing conditioning orifice plate differential pressure flow meters while minimizing performance errors which may be caused by flow disturbances to pressure ports, especially at higher beta ratios.

Other and further objects, features and advantages of the invention will become apparent from the following description of embodiments of the invention, taken in conjunction with the accompanying drawings.

SUMMARY OF THE INVENTION

The successful operation of traditional orifice plate flow meters is based on Bernoulli's theorem which states that along any one streamline in a moving fluid, the total energy per unit mass is constant, being made up of the potential energy and the kinetic energy of the fluid. Thus, when fluid passes through the orifice in a constricting pipe plate, the velocity of the fluid through the orifice increases. This increase in fluid velocity causes the kinetic energy of the fluid immediately downstream of the orifice plate to increase, while simultaneously decreasing the static pressure of the fluid at that same point. By sensing the static pressure on the upstream and downstream sides of the orifice plate, the decrease of static pressure on the downstream side results in a measurement of the pressure differential, dP, between the upstream side of the orifice plate and the downstream side. The rate of fluid flow q is proportional to $\sqrt{dP}$. As earlier stated, prior art orifice plate flow meters work well when the velocity profile is symmetrical about the longitudinal axis of the pipe in which the fluid is flowing. In such a case, the highest velocity fluid is along the central axis of the pipe, coaxial with the orifice of the constricting pipe plate. When traveling through the orifice, the increased velocity produces the pressure differential across the plate to provide the flow rate result.

However, if the velocity profile is skewed, the differential pressure across the constricting plate will not be a true indication of the rate of fluid flow.

Accordingly, an averaging orifice plate flow meter, such as Rosemount's Conditioning Orifice Plate, a flow impedance device having a plurality of variously positioned orifices, may be placed in a fluid-carrying conduit with static pressure measurement taken on the upstream and downstream sides of the plate. Each of the plurality of orifices will conduct a part of the total fluid flow within the conduit. According to Bernoulli's theorem, the velocity of the fluid through each of the orifices will increase, and the static fluid pressure on the downstream side of the constricting plate that is attributable to each of the separate orifices will be averaged within the fluid to provide an average downstream static pressure. The average downstream static pressure is compared with the upstream static pressure to provide an average differential pressure for whatever velocity profile is presented to the multiple orifice plate, resulting in an accurate measurement of the rate of fluid flow in the pipe.

However, even when such ideally simplistic flow conditioning devices are utilized, instead of upstream flow straighteners, disturbances to the pressure measuring ports, which are typically placed on the pipe wall some distance upstream and some distance downstream of the conditioning orifice plate, may still result especially when utilized in conjunction with higher beta ratio orifice plates downstream of typical pipe flow disturbances. Typical axially spaced pressure ports have an increased susceptibility to performance errors in such conditions.

Accordingly, the present invention incorporates at least one of the pressure taps into one of the respective faces of an averaging orifice plate, rather than spacing them some distance from either side of the plate. The incorporation of at least one of the pressure ports in this manner consists of at least one opening on at least one of the faces of the plate, upstream and/or downstream, connected by fluid communication channel(s) to respective pressure taps located on the circumferential edge of the plate, or alternatively, in the stem of the plate. These taps are then connected to a valve manifold and transmitter in the manner typical in the art to enable measurement of pressure differentials, ultimately used to calculate rate of fluid flow. Incorporation of at least one of the pressure taps into the face of the plate in this manner will minimize any adverse affect on the precision of the readings delivered by pressure taps even in disturbed conditions at higher beta ratios. An incorporated upstream port will allow measurement of the impact pressure at the face of the plate, thereby allowing measurement of higher differential pressures. The benefit will be better resolution of the pressure signal without additional pressure loss. An incorporated downstream port will allow measurement of the low static pressure in an area with high recirculation and mixing enabling a better averaging of downstream pressure despite flow disturbances. Alternate embodiments, wherein only one of the two pressure taps is incorporated into one of the respective faces of the plate and the other pressure tap is a tap of the type known in the art, such as a flange tap, would also realize some if not all of the aforementioned benefits.

DETAILED DESCRIPTION

Figure 1:
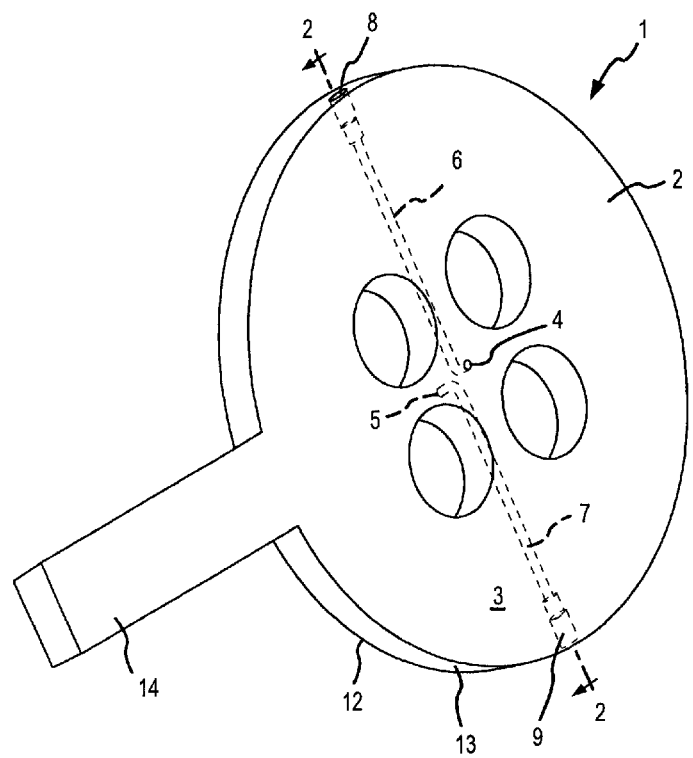
FIG. 1 is a perspective view of the conditioning orifice plate of the present invention with pressure ports on the circumferential edge of the circular portion of the plate, connected by conduits, represented by dotted lines, to respective openings on the upstream and downstream faces of the plate.
Figure 2:
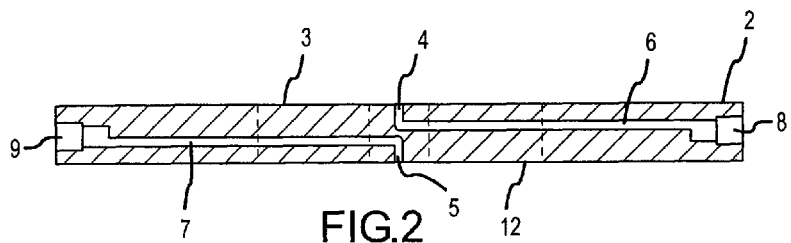
FIG. 2 is a cross-sectional view taken along lines 2-2 of FIG. 1.

A simplified version of the present invention is shown in FIGS. 1 and 2. The averaging orifice plate flow element comprises a flat plate 1 having a circular portion 2 and a stem 14. On a diametric line across the circular portion there is disposed within the plate a first conduit or bore 6 that interconnects the opening 4 in the downstream face 3 of the circular portion 2 of the plate to a first pressure sensing port 8 disposed in the circumferential edge 13 of the circular portion 2 of the plate. A second conduit or bore 7 interconnects an opening 5 in the upstream face 12 of the plate to a second pressure sensing port 9 in the circumferential edge 13 of the circular portion 2. The pressure ports are arranged to be connected to a traditional fluid manifold (not shown) and into a pressure transducer (not shown). An electrical signal that represents the sensed differential pressure between the ports 8 and 9 is transmitted by transmitter (not shown) to a processing unit (not shown).

Figure 3:
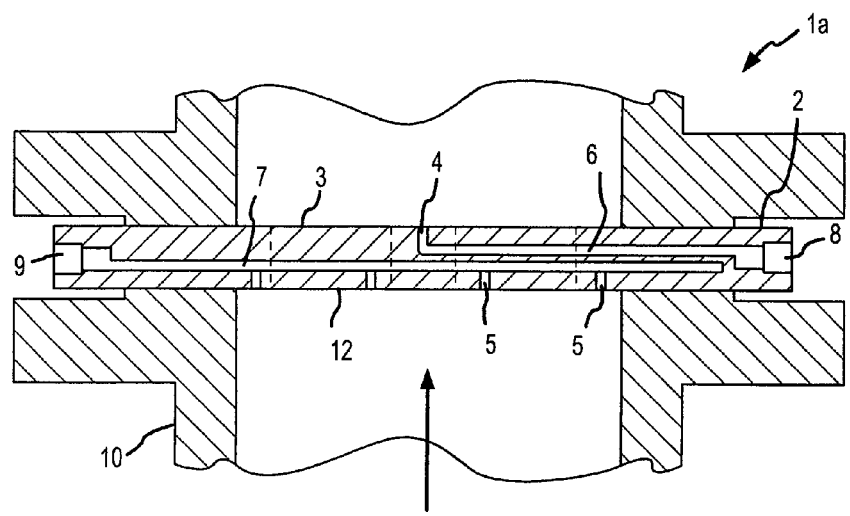
FIG. 3 is a cross-sectional view of the orifice plate of the present invention taken along lines 3-3 of FIG. 4, and showing a fragmentary cross-sectional view of the fluid carrying conduit into which the plate of FIG. 4 is placed upstream of the plate, with an arrow illustrating the direction of fluid flow.
Figure 4:
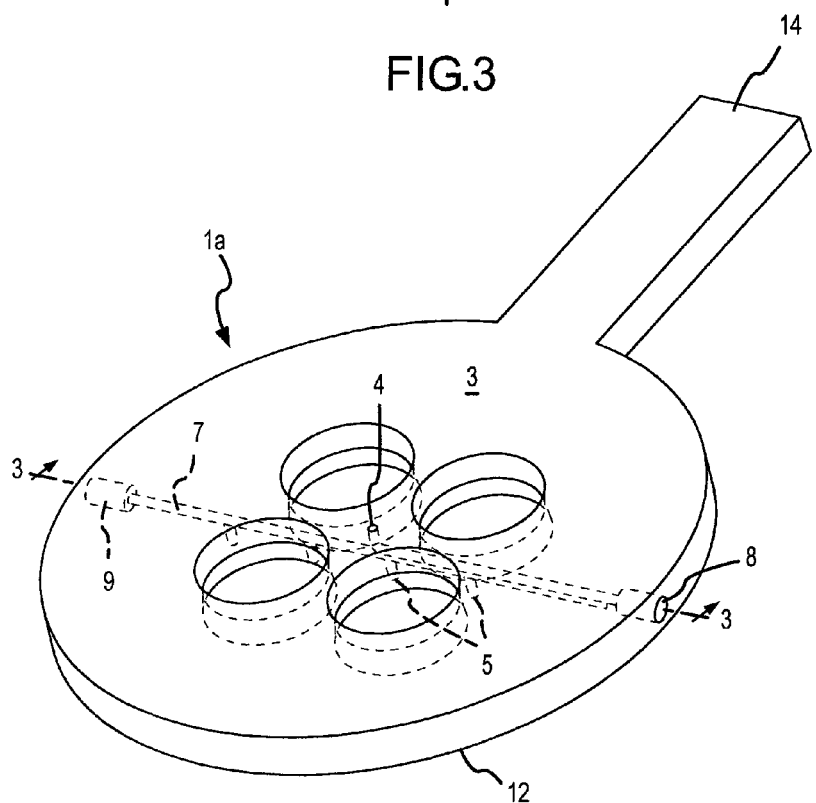
FIG. 4 is a perspective view of the orifice plate of the present invention, showing, in dotted lines, multiple openings in the upstream face of the plate connected by a conduit to the upstream pressure port, and a single opening on the downstream face of the plate connected by a conduit to the downstream pressure port.

FIGS. 3 and 4 illustrate an embodiment of the primary flow element having a plate 1a adapted to be inserted into a fluid carrying conduit 10. In this embodiment a plurality of openings 5 are disposed on the upstream face 12 of the circular portion of the plate flow element. A conduit or bore 7 is disposed on a diametric line within the circular portion 2 of the plate, establishing fluid communication between the openings 5 and a high pressure sensing port 9 located in the circumferential edge of the circular potion 2 of the plate. It is understood that four openings in the upstream surface of the primary flow element plate is only one of many possible configurations of openings. One particular number of openings may be more appropriate to a given fluid, fluid profile and piping characteristics than another.

Figure 5:
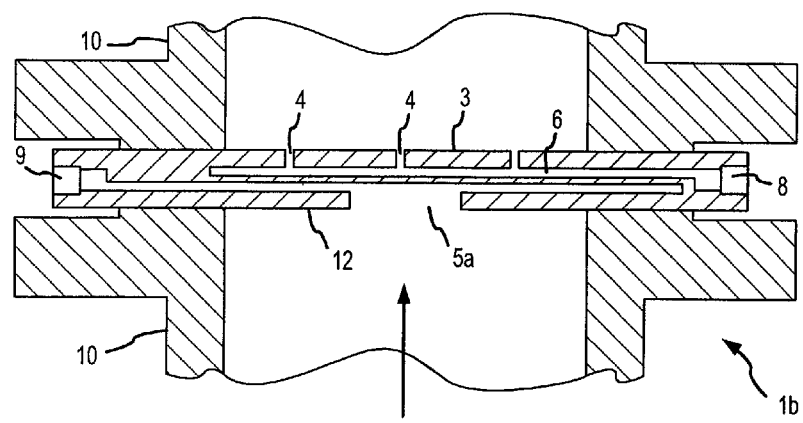
FIG. 5 is a cross-sectional view taken along lines 5-5 of FIG. 6, and showing a fragmentary cross-sectional view of the fluid carrying conduit into which the plate of FIG. 6 is placed upstream of the plate, with an arrow illustrating the direction of fluid flow.
Figure 6:
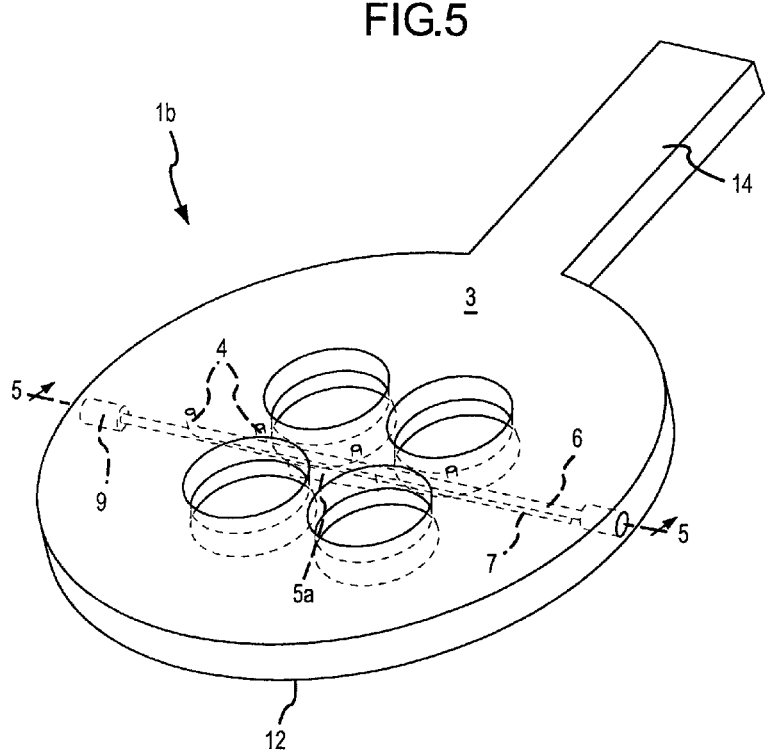
FIG. 6 is a perspective view, showing, in dotted lines, a diametrically extending slot as the opening in the upstream face of the plate, and, in dotted lines, multiple openings in the downstream face of the plate.

FIG. 6 illustrates a third embodiment 1b of the primary flow element intended to be inserted into a fluid carrying conduit 10, as shown in FIG. 5. In this embodiment the upstream facing opening is a diametrically extending slot 5a allowing for enhanced pressure signals and low noise, as described in U.S. Pat. No. 6,321,166. While this embodiment is shown to incorporate a plurality of openings 4 in the downstream facing side 3 of the plate, it is understood that this is only one of many possible low pressure opening arrangements.

Figure 7:
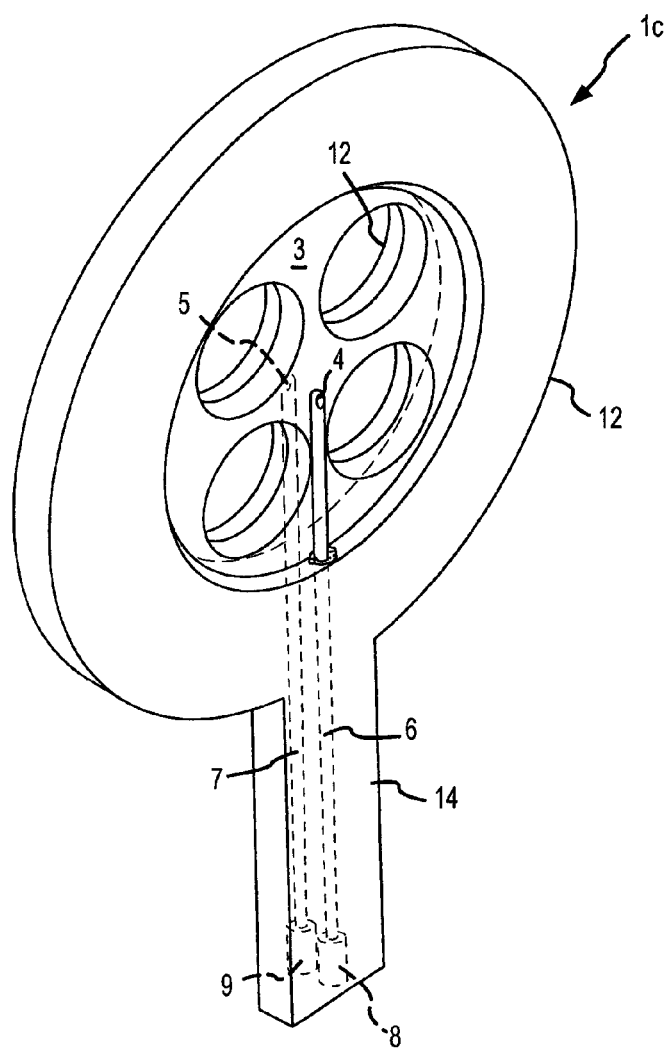
FIG. 7 is a perspective view showing raised surface conduits carried by the plate establishing fluid communication between the openings on the faces of the plate and their respective pressure ports.

FIG. 7 illustrates a fourth embodiment 1c of the present invention in which a portion of the pressure conducting conduits 6 and 7 lie on the respective downstream and upstream surfaces of the circular portion of the primary flow element while the remaining portions of the conduits lie within the stem 14. Located at the respective distal ends of the exterior portions of the conduits 6 and 7 are pressure receiving openings 4 and 5 that face downstream and upstream. The portion of the conduits 6 and 7 that are located within the stem 14 terminate in respective pressure transmitting ports 8 and 9.

Figure 8:
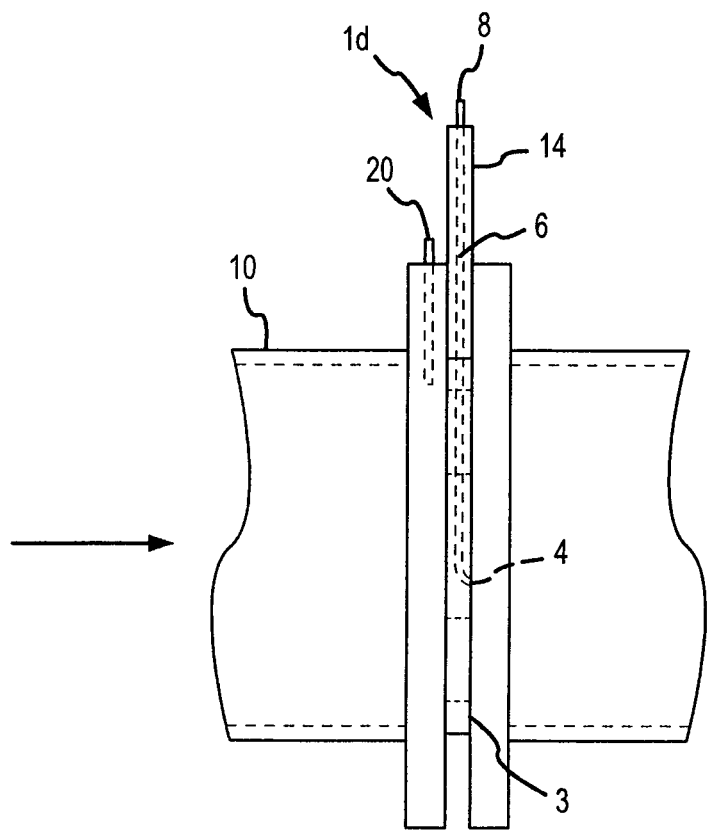
FIG. 8 is a side view of the orifice plate of the present invention inserted into a fluid carrying conduit, in an embodiment wherein only the downstream pressure tap is incorporated into the downstream face of the plate, with an arrow indicating direction of fluid flow.

FIG. 8 represents yet another embodiment 1d of the present invention, in which only one of the pressure taps is incorporated into a face of the circular portion of the plate. As shown, the downstream tap 4 incorporated into the downstream face 3 of the plate and connected via a bore 6 to the pressure port 8, located within the stem 14. The upstream pressure sensor 20 is a tap of the type known in the art that may be placed in the wall of the fluid conducting pipe or in the pipe flange, as shown in the drawing.

What is claimed is:

1. A differential pressure fluid flow meter element for insertion between the connecting flanges of conduit sections of a fluid carrying conduit, comprising,
   a flat circular plate having a parametric edge, a center and upstream and downstream facing surfaces which are perpendicular to a fluid flow in the conduit sections, the upstream and downstream facing surfaces each having a fluid engaging portion for disposition within the fluid carrying conduit, the flat circular plate further including a solid center region which includes the center of the flat circular plate,
   a plurality of apertures formed in the fluid engaging portions of the circular plate and which are eccentrically disposed with respect to the solid center region of the plate, the apertures permitting fluid carried by the conduit to flow through the circular plate,
   at least one opening in at least one of the fluid engaging portions in the solid center region,
   at least one pressure port disposed in the parametric edge of the plate, and
   at least one conduit extending to the solid center region carried by the plate in fluid communication with the at least one opening in at least one of the fluid engaging portions and the at least one pressure port.

2. The differential pressure flow meter element of claim 1, wherein the at least one opening in at least one of the fluid engaging portions of the circular plate is in the downstream facing surface of the circular plate.

3. The differential pressure flow meter element of claim 1 where the at least one opening in the fluid engaging portions of the circular plate is an elongated diametrically extending slot in the fluid engaging portion of the upstream facing surface.

4. The differential pressure flow meter element of claim 1 wherein the at least one opening in the fluid engaging portions of the circular plate includes a plurality of openings in the fluid engaging portion of the upstream facing surface, said openings lying on a diametric line across the circular plate.

5. The differential pressure flow meter element of claim 1 and further including,
   an elongated stem extending radially from the circumferential edge of the circular plate and having a distal end.

6. The differential pressure flow meter element of claim 5 wherein the at least one pressure port is disposed in the distal end of the stem of the plate.

* * * * *